United States Patent [19]
Baumann et al.

[11] Patent Number: 5,688,396
[45] Date of Patent: Nov. 18, 1997

[54] OIL FILTER INCLUDING AN ANGLED MOUNTING SURFACE

[75] Inventors: Dieter Baumann, Greven; Wilhelm Ardes, Ascheberg, both of Germany

[73] Assignee: Walter Hengst GmbH & Co. KG, Muenster, Germany

[21] Appl. No.: 590,632

[22] Filed: Nov. 8, 1995

[30] Foreign Application Priority Data

Jun. 16, 1995 [DE] Germany .................. 295 09 806 U

[51] Int. Cl.⁶ .................................................. B01D 35/30
[52] U.S. Cl. .................... 210/130; 136/232; 136/248; 136/440; 136/444; 450/454
[58] Field of Search ........................ 123/196 A; 210/168, 210/248, 440, 443, 444, 232, 438, 450, 454, 457, DIG. 17, 130, 136

[56] References Cited

U.S. PATENT DOCUMENTS

| | | | |
|---|---|---|---|
| 2,750,042 | 6/1956 | Wilkinson | 210/440 |
| 2,987,966 | 8/1961 | Humber, Jr. | 210/168 |
| 3,000,506 | 9/1961 | Hultgren | 210/DIG. 17 |
| 3,457,339 | 7/1969 | Pall et al. | |
| 4,521,309 | 6/1985 | Pall | |
| 4,536,291 | 8/1985 | Hoffmann et al. | |
| 4,863,599 | 9/1989 | Gnenther et al. | 210/440 |
| 4,906,365 | 3/1990 | Baumann et al. | 123/196 A |
| 4,956,089 | 9/1990 | Hurst | |
| 5,045,192 | 9/1991 | Terhune | |
| 5,211,846 | 5/1993 | Kott et al. | |
| 5,250,179 | 10/1993 | Spearman | |
| 5,291,863 | 3/1994 | Jones | 123/196 A |
| 5,538,626 | 7/1996 | Baumann | 210/440 |

FOREIGN PATENT DOCUMENTS

| | | | |
|---|---|---|---|
| 3933794 | 4/1991 | Germany | 210/443 |
| 2 163 368 | 2/1986 | United Kingdom | |
| 2 226 254 | 6/1990 | United Kingdom | |
| WO 92/17262 | 10/1992 | WIPO | 210/440 |

Primary Examiner—Matthew O. Savage
Attorney, Agent, or Firm—Hill, Steadman & Simpson

[57] ABSTRACT

A liquid filter, in particular for oil or fuel in an internal combustion engine, with the liquid filter comprising a filter housing with at least one liquid intake passage and at least one liquid return passage, a releasable cover which closes the filter housing liquid-tight, and an individually replaceable filter insert which can be removed from the filter housing. A hollow fastening screw is arranged centrally in the front wall of the filter housing with the front wall facing the filter connecting flange when in the mounted condition, with the fastening screw turnable in relation to the filter housing. The liquid filter may be tightly screwed to a filter connecting flange of, e.g., an internal combustion engine. A longitudinal middle axis of the filter housing and the plane of the front wall are arranged at an angle <90° relative to each other, and the longitudinal middle axis of the fastening screw and the plane of the front wall extend at a right angle towards each other when in the mounted condition.

20 Claims, 5 Drawing Sheets

OIL FILTER INCLUDING AN ANGLED MOUNTING SURFACE

BACKGROUND OF THE INVENTION

The invention relates to a liquid filter, in particular for oil or fuel in an internal combustion engine, with the liquid filter comprising a filter housing with at least one liquid intake passage and at least one liquid return passage, a releasable cover which closes the filter housing liquid-tight, and an individually replaceable filter insert which can be removed from the filter housing, wherein a hollow fastening screw is arranged centrally in the front wall of the filter housing with the front wall facing the filter connecting flange when in the mounted condition, with the fastening screw turnable in relation to the filter housing, and wherein the liquid filter may be tightly screwed to a filter connecting flange of, e.g., an internal combustion engine, instead of an only completely replaceable screw-on replaceable filter.

A liquid filter of the kind mentioned is known from DE 94 11 212 U1. The liquid filter according to the prior art has generally proven successful for the intended purpose in practical experience. However, it has been found that under certain mounting conditions, the known liquid filter is usable only with increased mounting or dismantling outlay, or not at all.

Furthermore, it is known from practical experience to mount a common one-way oil filter at the engine block of an internal combustion engine with an angled adapter inbetween. With this construction it is a disadvantage, that during the initial mounting, first the angled adapter has to be positioned and screwed on, and that only then can the oil filter be mounted on the angled adapter. In addition to the increased outlay in mounting, there is also an increased risk of leakages occurring because two sealing areas are present, namely a first one between the filter connecting flange at the side of the engine and the angled adapter on the one hand, and a second one between the angled adapter and the one-way oil filter on the other hand.

SUMMARY OF THE INVENTION

It is therefore an object of the present invention to further develop the liquid filter of the kind mentioned before, such that also under difficult mounting conditions, particularly under restricted spatial conditions, it may be used, wherein the required outlay in mounting and disassembling must be as low as possible, and wherein the replacement of the filter insert must be possible without any problems and in a time saving fashion.

According to the invention, this object is attained by a liquid filter of the kind mentioned before which is characterized in that the longitudinal middle axis of the filter housing and the plane of the front wall are arranged at an angle of <90° relative to each other, and that the longitudinal middle axis of the fastening screw and the plane of the front wall extend at a right angle towards each other when in the mounted condition.

The liquid filter according to the present invention, on the one hand, offers the advantage of a very simple mounting because a separate angled adapter is no longer necessary. By this means a sealing area is avoided such that the danger of leakages is cut in half. On the other hand, the advantage is gained that the filter housing, by rotation about the fastening screw, may be aligned in various directions in relation to the filter connecting flange and may then be fastened thereto. Thereby various mounting conditions may be coped with without the necessity for different and especially adapted filter housings.

In order to keep the mounting of the liquid filter to the filter connecting flange as simple as possible, preferably the axial length of the filter housing sidewall extending from the front wall is dimensioned such that the axial projection of the fastening screw does not intersect the filter housing sidewall. In this way, advantageously, a longitudinal tool, e.g. a box spanner, in a direction aligned with the longitudinal axis of the fastening screw, may be engaged with the latter in order to screw in or screw out the fastening screw. The complicated use of angled screwing tools, requiring a repeated engagement after a certain angle of rotation, is avoided.

Preferably the angle between the longitudinal middle axis of the filter housing and the plane of the front wall is between 15° and 45° whereby generally all cases of application, in practical experience, are covered.

To simplify the mounting of the liquid filter at the filter connecting flange, preferably the fastening screw is held captive at the front wall of the filter housing. In this manner, even in a "hanging" mounting of the liquid filter, the mounting of the filter housing may be accomplished without difficulties since it is sufficient to hold the filter housing at the outside thereof with one hand and then to turn the fastening screw held at the front wall of the filter housing with the other.

In order to use common screwing tools for the mounting of the liquid filter, preferably the fastening screw at its end pointing towards the cover has an inner and/or outer polygon provided as a screwing tool dog point. The use of special tools, like, e.g., strap wrenches or wrenches of extreme size, is thereby avoided.

Furthermore, it is preferably provided that radially outwards in the surface of the front wall of the filter housing facing the filter connecting flange, an angular groove is provided for receiving a sealing ring, wherein in the relaxed condition of the sealing ring the latter protrudes out of the groove, and wherein in the mounted condition of the liquid filter the sealing ring is completely received in the angular groove while being elastically deformed. Thereby, the facing surfaces of the filter connecting flange and the front wall of the filter housing are directly abutting each other in the tightly screwed condition of the fastening screw such that a high security against unintended loosening of the filter housing or the fastening screw, respectively, is guaranteed. At the same time, the sealing ring is mechanically relieved such that the latter has a longer life span, without impairing the security of the sealing effect thereof.

In order to avoid that when changing the filter insert liquid, e.g. oil or fuel, may penetrate the environment and contaminate it, it is proposed that in the filter housing, in the lowest area in the mounted condition thereof, additionally a liquid drain passage is provided. In the filter housing within the liquid drain passage, a drain valve is arranged which is held in a closed position by the filter insert inserted in the filter housing when the cover is closed. When opening the cover, the drain valve will proceed into its open position as the filter insert is automatically taken with the cover. By means of this liquid drain valve, which is known as such, the interior of the filter housing is drained without further means, by releasing the cover and removing the filter insert from the filter housing. Thus a contamination of the environment is effectively avoided.

A first embodiment of the liquid filter described in the foregoing paragraph provides that the liquid drain passage corresponds with a liquid drain passage provided at the filter connecting flange. By this means, no external pipes are required for the drainage of the liquid filter wherein, however, the filter connecting flange has to be designed with a correspondingly arranged liquid drain passage.

An alternate embodiment, in particular usable for a re-fitting or retrofitting, provides that the liquid drain passage is guided in a connecting piece for pipes or hoses at the outside of the filter connecting flange, with the connecting piece to be connected with a pipe or hose connection for drainage of the liquid into a pressure relieved liquid supply or collecting tank. This embodiment of the liquid filter also enables the use in those cases in which the filter connecting flange is fixed in the design thereof and therefore may not be varied for the purposes of the drainage of the liquid filter. The pipe or hose connection to be connected with the hose or pipe connecting piece may then be guided to a suitable area, e.g., into the oil sump of an internal combustion engine in the case of an oil filter, or into the fuel tank in the case of a fuel filter. Since the pipe or hose connection has to be mounted only once, the additional outlay for mounting caused by an external pipeline is only limited.

An alternate embodiment of the liquid filter is characterized in that at the circumference of the filter housing and/or at the circumference or front wall at the cover, a liquid drain opening is provided which is closed during operation and may be opened on request, with the liquid drain opening serving for the drainage of the filter housing. Because of the above explained free positioning of the filter housing in the circumferential direction thereof, a liquid drain opening provided at the circumference of the filter housing may be positioned such that it points downwards in the mounted condition of the filter housing to enable a practically complete drainage of the filter housing when opening the liquid drain opening. In this way an unintended liquid leakage, e.g. of oil or fuel, is avoided when changing the filter insert. Furthermore, the removed filter insert will contain only very small residues of liquid, thus providing a further contribution to protect the environment. The same advantages will result with a filter housing which is arranged hanging in vertical direction with the cover pointing downward, such that by means of the liquid drain opening provided in the cover, a complete drainage of the filter housing before opening the cover is possible.

Preferably the liquid drain opening is designed as an aperture or threaded bore closed by a releasable screw, whereby a simple construction of the filter and a simple operation is assured.

In order to prevent the filter from emptying during non-operation, for example given stand-still of an appertaining internal combustion engine, and in order to prevent filtered liquid, for example oil from an internal combustion engine, from emerging toward the outside when the filter housing is open, it is proposed that in the axial liquid passage in the fastening screw, i.e. at the filtered side, a return check valve is arranged.

In order to achieve the same double purpose, but at the crude or unfiltered side, a check diaphragm is provided between the intake passage and filter insert in the flow path of the liquid to be filtered at the side of the filter housing at the front wall of the filter housing. Preferably the return check diaphragm is flexible and has the shape of a circular disk and is held at the radially inner edge thereof. Thereby a simple production of the return check diaphragm and a securement of the return check diaphragm is attained with little effort.

In order to support the inner circumference of the filter insert, it is proposed that the cover is connected with a support member aligned with the filter insert, with the support member supporting the inner circumference of the folds of a zigzag-like folded star-shaped filter insert arranged in the filter housing as the filter insert. Alternatively the cover and support member may be formed as one piece.

A further development of the last explained embodiment of the liquid filter proposes that a bypass valve is provided in the support member, to allow for a direct flow path from the crude side to the clean side while bypassing the filter insert, the flow path being opened by the bypass valve given an upward transgression of a presettable pressure differential between the crude side and the clean side of the liquid filter. What is assured in this way is that a passage of liquid through the filter is at least still possible when the filter insert has become unpenetratable, in order, for example, to continue to enable the fuel supply or lubricant supply of an internal combustion engine.

In order to assure at least a certain filtering of the liquid flowing through the filter in this last described instance, it is proposed that a bypass filter element is arranged in the course of the direct flow path from the crude side to the clean side of the filter. As a result thereof, coarse contaminants of the liquid flowing through the filter are still intercepted, thus avoiding serious damage to an appertaining internal combustion engine under certain circumstances.

For facilitating the replacement of the filter insert, it is proposed that the cover and the filter insert are equipped with snap-in connector means that can be brought into engagement with one another. The provision of such snap-in connector means assures that the filter insert is removed from the housing by the cover when the cover is taken off of the filter housing. After the filter insert is removed from the filter housing by releasing the cover, the snap-in connector between the filter insert and cover can then be unproblematically released and a new filter insert can then be latched to the cover and can in turn be installed into the filter housing in the reverse order, in that the cover is again joined to the filter housing, for example screwed thereto. At the same time, the connection between the cover or the support member on the one hand, and the filter insert on the other hand, assures that when releasing the cover, the filter insert is also instantaneously moved into the removing direction in relation to the filter housing. In the embodiments of the filter having a liquid drain valve of this type, an opening of the drain valve as early as possible is assured, such that sufficient time is available for the complete drainage of the filter insert and the filter housing until the cover is completely opened and the filter insert is removed from the housing. A penetration of the liquid to be filtered into the environment during the maintenance in this way is safely avoided, because for the drainage of the filter housing no particular handling is necessary.

The support member may be removably connected with the cover or may be designed integral with the cover. Alternately the support member may be designed as a part of the filter housing, wherein the support member is then preferably detachably connected with the filter housing, in order not to restrict the accessibility of the fastening screw. Furthermore, the possibility exists to design the support member as a part of the filter insert, wherein in this case the support member either is loosely arranged within the filter insert between the front disks, or may be designed as a part of one front disk or both front disks.

It is preferably provided that the support member is also joined to the cover in a clamping or latching fashion and that the bypass valve, optionally provided in the supporting member, is also formed as a structural unit that can be joined, preferably latched, to the support member. Additionally, the bypass filter element that is optionally provided can also already be held at the cover, so that a large structural unit composed of cover, support member, bypass valve, bypass filter element and filter insert can be formed. This substantially simplifies the mounting and servicing of the liquid filter of the invention.

It is meaningful or necessary in many instances to also cool or heat the liquid to be filtered, to which end a heat exchanger is to be provided next to the filter. It is known from practical experience to arrange a separate heat exchanger between the filter connecting flange and the liquid filter. It is a disadvantage, however, that additional room for mounting is required and also a higher outlay for mounting. As an alternative, the liquid filter of the invention offers the possibility of an integrated fashioning of the heat exchanger.

A first solution with respect thereto proposes that the filter housing comprises liquid passages and a connecting flange for a heat exchanger through which the liquid to be filtered or the filtered liquid can flow, with the heat exchanger flanged to the filter housing. As a result thereof, the heat exchanger and liquid filter can be combined given good exploitation of the space even under constricted conditions as, for example, frequently occur in the engine compartment of motor vehicles.

An alternate solution with respect to the heat exchanger proposes that the filter housing is fashioned of one piece with the heat exchanger housing, thereby providing a heat exchanger through which the liquid to be filtered or the filtered liquid and a second liquid can flow. A very compact construction is advantageously provided in this manner.

The filter housing is preferably a light metal die cast part, for example an aluminum or magnesium alloy. The cover serving the purpose of closing the filter housing can optionally be an injection molded plastic part or can likewise be a light metal die cast part. Due to the mechanical stresses that the fastening screw must absorb, it is preferably a steel part that is processed by machining. The various seal rings as well as the check diaphragm are preferably elastomer parts, as is standard. The support member and the bypass valve, optionally fashioned integrated therewith, are likewise preferably injection molded plastic parts. This is also true of the check valve optionally provided in the fastening screw. The filter insert is advantageously composed of materials that allow a complete thermal processing (incinerating) after being used, for example of filter paper for the filter member and of plastic, for example polyamide, for the front disks and felt or rubber for the seals and the front disks.

BRIEF DESCRIPTION OF THE DRAWINGS

Exemplary embodiments of the invention are set forth below with reference to a drawing. The figures of the drawing show each in longitudinal section.

DETAILED DESCRIPTION OF THE PREFERRED EMBODIMENTS

Figure 1:
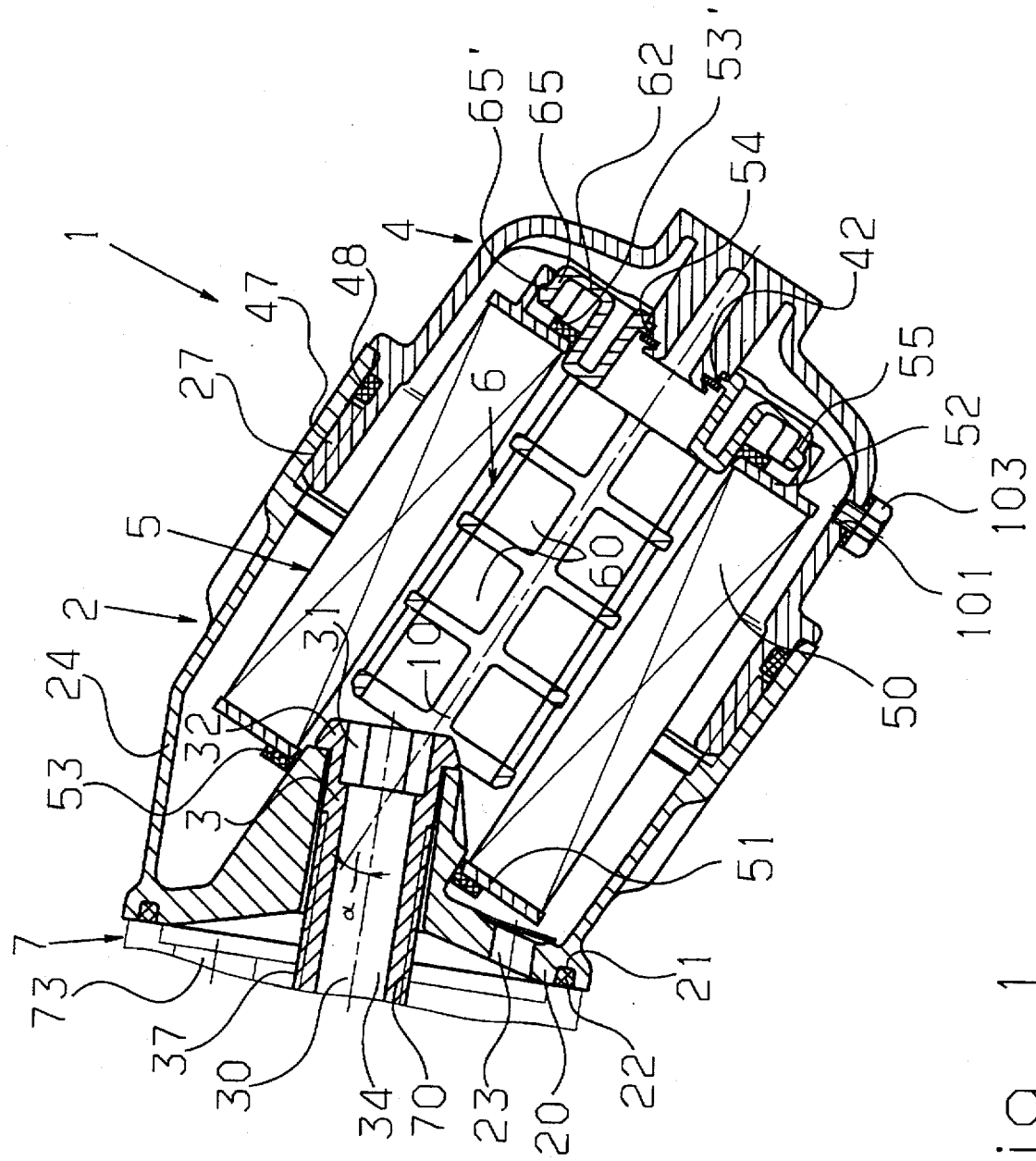
FIG. 1 is a liquid filter in a first embodiment.

As a first embodiment in FIG. 1 of the drawing, a liquid filter 1 is illustrated in a mounting condition pointing angularly downwards. The liquid filter 1 comprises an essentially cup-shaped filter housing 2 provided with a front wall 20 and a circular circumferential sidewall 24. The front wall 20 at its outwards extending side, i.e. to the left in the figure, carries an annular groove 21 in which a sealing ring 22 of elastomeric material is arranged. Offset in radial direction thereto there is illustrated an intake passage 23 in the lower part of the front wall 20, wherein usually several such intake passages 23 are provided distributed along the circumference of the front wall 20. A central fastening screw 3, which is fashioned with an outside thread 37, is arranged in turnable fashion in the center of the front wall 20. The fastening screw 3 is supported at the inside of the front wall 20 with a collar 32.

The left hand part of FIG. 1 shows a filter connecting flange 7 that, for example, is part of the engine block of an internal combustion engine. An intake passage 73 lies in the upper part of the filter connecting flange 7, liquid to be filtered proceeding through this intake passage 73 to the intake passage 23 within the front wall 20 of the liquid filter 1. In this case, the hollow interior of the fastening screw 3 forms a return passage 34, wherein the hollow fastening screw 3, with the outer thread 37 thereof, is screwed into a threaded bore with a matching counter thread 70 in the filter connecting flange 7. As a result thereof, the filter housing 2 is pressed against the filter connecting flange 7 and is sealed by means of the sealing ring 22.

The filter housing 2 is fashioned open at its side pointing toward the right in FIG. 1 and has an inner thread 27 at the inside of its circumferential wall 24. A cover 4 can be screwed in sealing fashion into this inner thread 27 with a matching outside thread 47 upon the interposition of a further sealing ring 48.

Further, a filter insert 5 is arranged in the inside of the liquid filter 1. This filter insert 5 is composed of a zigzag-shaped folded filter member 50 which is joined liquid tight, for example glued or welded, to a respective front disk 51, 52 at the top and bottom. The left hand front disk 51 in FIG. 1 is plugged in sealing fashion onto a projection of the front wall 20 of the filter housing 2 upon the interposition of an appertaining seal 53.

A central support member 6 is connected with the inside of the cover 4 upon the interposition of a seal 54, with the support member 6 having an essentially hollow cylindrical, lattice-like structure and serving the purpose of supporting the inside circumference of the filter member 50. The support member 6, with the end 62 at the side of the cover, is held at the cover 4 for which purpose the latter comprises a receptacle 42 for the support member at its inside. The right hand front disk 52 of the filter insert 5 is put on the end 62 of the support member 6 at the side of the cover upon interposition of a further seal 53'. Furthermore, this right hand front disk 52 is provided with catch receptacles 55 protruding towards the free side thereof, with the catch receptacles cooperating with catch noses 65' attached at catch tongues 65 of the central support member 6. In this manner, a snap-in connection is achievable between the filter insert 5 and the central support member 6, whereby the cover 4 is connectable with the support member 6 and the filter insert 5 to form a construction unit to be commonly handled.

The fastening screw 3, at the free end thereof pointing to the interior of the filter housing 2, is provided with an inner hexagon 31 serving for engagement with a screwing tool.

As is further illustrated in FIG. 1 of the drawing, the longitudinal axis 30 of the fastening screw 3 extends rectangularly in relation to the plane of the front wall 20 and the plane of the filter connecting flange 7. On the other side, the longitudinal middle axis 10 of the liquid filter 1 extends angularly in relation to the longitudinal axis 30 of the fastening screw 3, forming an angle α which is about 25° in the example shown. In the embodiment illustrated, the cover 4 of the liquid filter 1 points downwards in an angular direction. The same filter 1 may also be mounted in different mounting positions since the front wall 20, with the fastening screw 3 released, is freely turnable in relation to the fastening screw and to the filter connecting flange 7 about axis 30. By this means the filter housing 2 may be attached to the filter connecting flange 7 pointing in any direction. This enables a preferably simple adaption to different mounting situations, at e.g., different internal combustion engines, without a different filter housing 2 being necessary.

The liquid filter described beforehand is particularly suitable to replace common screw-on replaceable filters replaceable only as a unit. With the primary mounting of the liquid filter 1, at first the filter housing 2 is positioned in front of the filter connecting flange 7, and then is pressed against the filter connecting flange 7, and then is secured against the filter connecting flange by turning the fastening screw 3. Because of the turnability of the fastening screw 3 in relation to the filter housing 2, only the fastening screw 3 is turned during the mounting operation while the filter housing 2 is being held against movement in a circumferential direction. As a result thereof, the seal ring 22 at the front wall 20 of the filter housing 2 is also not stressed in circumferential direction, this assuring that no leaks occur here as a consequence of a dislocation or distortion of the seal ring 22. Further, a metallic surface of the front wall 20 lies against what is likewise usually the metallic surface of the filter connecting flange 7, so that a high reliability against unscrewing is assured in the screwed together condition. For completing the liquid filter 1, only the construction unit assembled beforehand, and comprising the cover 4, support member 6 and filter insert 5, has to be screwed together with the filter housing 2. For changing the filter insert 5, as is required after a certain service time, only the cover 4 has to be screwed off, wherein at the same time, the filter insert 5 and the support member 6 are moved out of the filter housing 2. After removing the used filter insert 5 from the catch elements 65, 65' and snapping in a new filter insert 5, the mounting of the liquid filter 1 may be accomplished in a way likewise simple by screwing the cover 4 onto the filter housing 2. The filter insert 5, being the only construction member to be replaced for maintaining the filter, preferably consists of materials which enable a complete thermal processing (incineration) without any problems.

Figure 2:
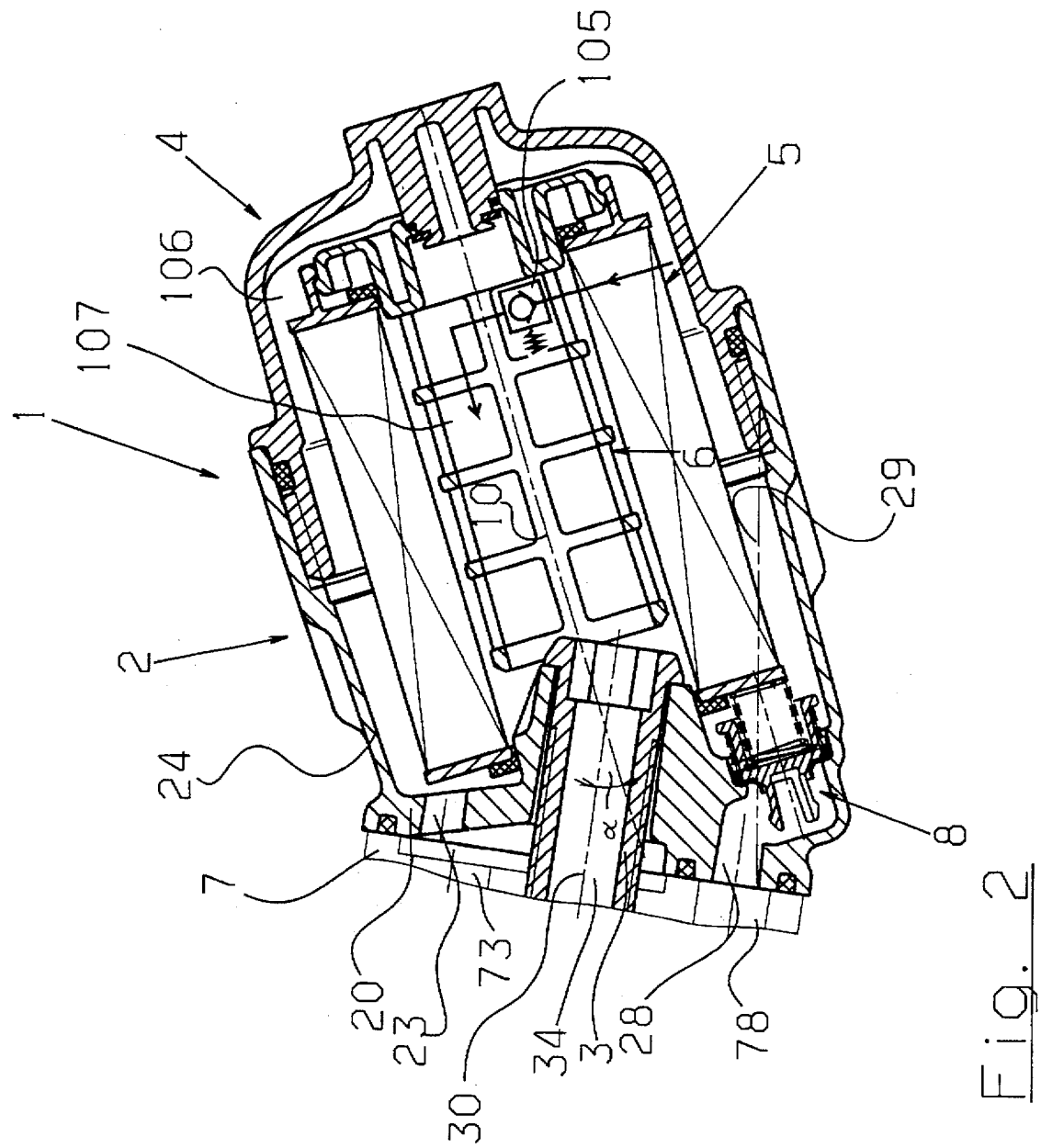
FIG. 2 is the liquid filter in a second embodiment.

FIG. 2 of the drawing shows a second embodiment of the liquid filter 1 with the mounting situation being such that the cover 4 points upwards in angular direction. The filter connecting flange 7, in the same way as in the example in FIG. 1, is slightly inclined downwards with an angle from vertical of approximately 8°. The angle α between the longitudinal axis 10 of the liquid filter 1 and the longitudinal axis 30 of the fastening screw 3 in this case also is about 25°, however, in the opposite direction from that shown in FIG. 1.

In the embodiment according to FIG. 2 a liquid drain passage 28 is additionally provided in the filter housing 2 with the liquid drain passage opening into a liquid drain passage 78 in the filter connecting flange 7. A drain valve 8 is mounted in the liquid drain passage 28 in the filter housing 2 in a known manner. The drain valve 8 is designed such that it is pressed into a closed position by a filter insert 5 inserted into the filter housing 2 with the cover 4 closed. When loosening the cover 4, and by this operation removing the filter insert 5, the drain valve 8 is brought into its open position by force of a spring, whereby a drainage as far as possible of the interior of the filter housing 2, up to a liquid level 29, is possible. In this way the drainage is accomplished before the cover 4 is completely screwed-off, such that when removing the filter insert 5 from the filter housing 2, the insert is almost free of liquid.

In the further parts, the liquid filter 1 according to FIG. 2 corresponds with the example according to FIG. 1 described before.

Figure 3:
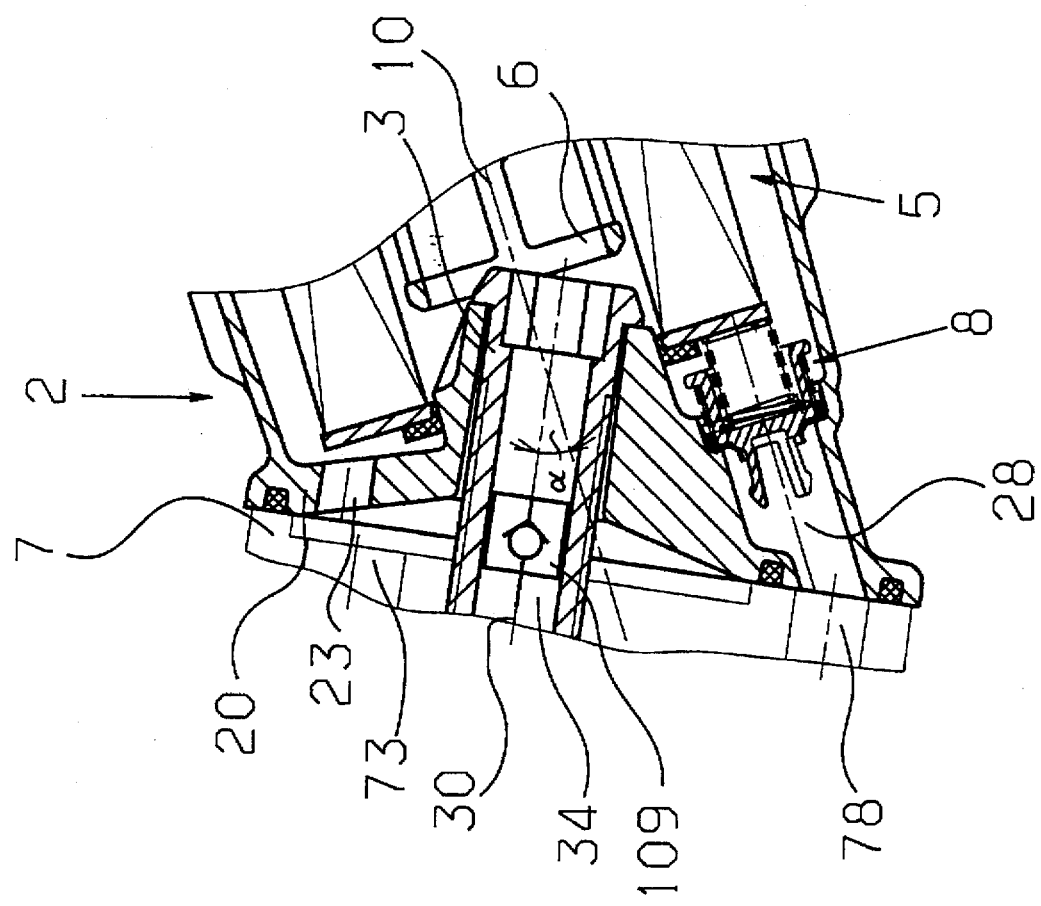
FIG. 3 is the liquid filter in a third embodiment in a section at a front side.

A further exemplary embodiment of the liquid filter 1 is illustrated in FIG. 3 in a part section illustrating only the lower part of the filter housing 2 with the fastening screw 3 and a part of the filter connecting flange 7. Also with this embodiment, a liquid drain passage 28 is provided in the filter housing 2, wherein in this case, the liquid drain passage 28 is substantially straight in its course, pointing continually downwards. Also in this case, a drain valve 8 is mounted in the manner described before within the liquid drain passage 28. The advantage of this embodiment according to FIG. 3, is that a complete drainage of the interior of the filter housing 2 is possible since the liquid drain passage 28 has no upward inclination as was provided in the liquid drain passage 28 according to FIG. 2. However, the advantage of the complete drainage in the embodiment in FIG. 3 is combined with a somewhat larger area requirement with respect to the filter connecting flange 7, because the latter has to extend further downwards, and the liquid drain passage 78 in the filter connecting flange 7 has to be arranged at a lower level. In the other features, the embodiment according to FIG. 3 corresponds with the embodiment of the liquid filter 1 according to FIG. 2.

Figure 4:
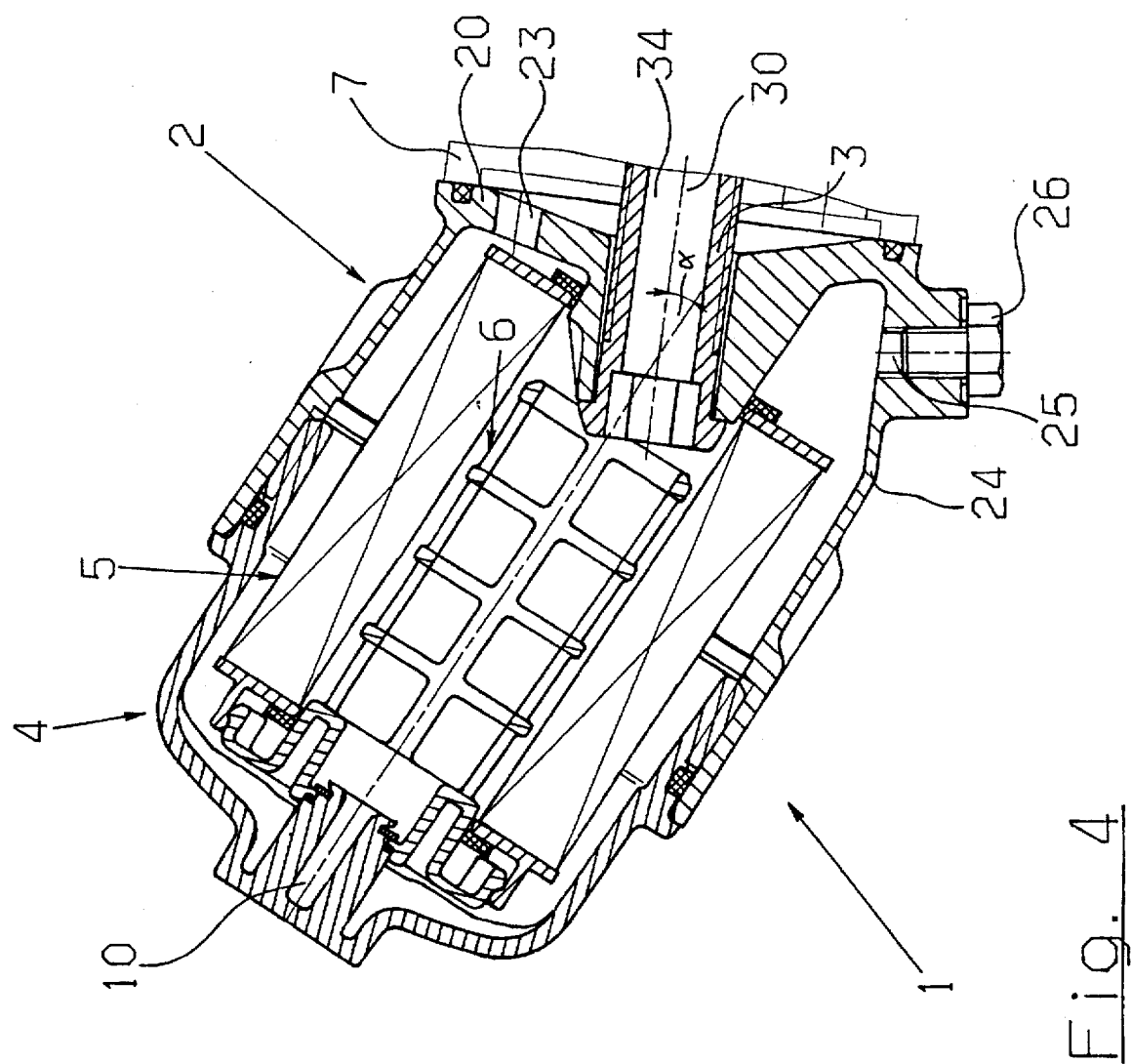
FIG. 4 is the liquid filter in a fourth embodiment.

FIG. 4 of the drawing illustrates an exemplary embodiment of the liquid filter 1 wherein the cover 4 points upwards in angular direction, however, with no liquid drain passage provided within the filter connecting flange 7. Instead, the exemplary embodiment according to FIG. 4 comprises an outer liquid drain passage 25 in the circumferential wall 24 of the filter housing 2. In normal operation of the liquid filter 1, this drain opening 25 is closed liquid tight by a screw 26 with a sealing ring thereunder. In case the filter insert 5 has to be replaced, first the screw 26 has to be screwed out and thus the drain opening 25 opened, and then the interior of the filter housing 2 will be completely emptied of any liquid. After this drainage has occurred and the screw 26 returned to seal the opening 25, then the cover 4 may be screwed off, and as described before, the filter insert 5 and the support member 6 may be removed from the filter.

Also in the exemplary embodiment according to FIG. 4, between the longitudinal axis 30 of the fastening screw 3 and the longitudinal axis 10 of the liquid filter 1, an angle α is provided comprising also in this case approximately 25°. The plane of the filter connecting flange 7 here is inclined by about 8° upwards from vertical. In all other parts the liquid filter 1 according to FIG. 4 corresponds with the embodiments described before.

Figure 5:
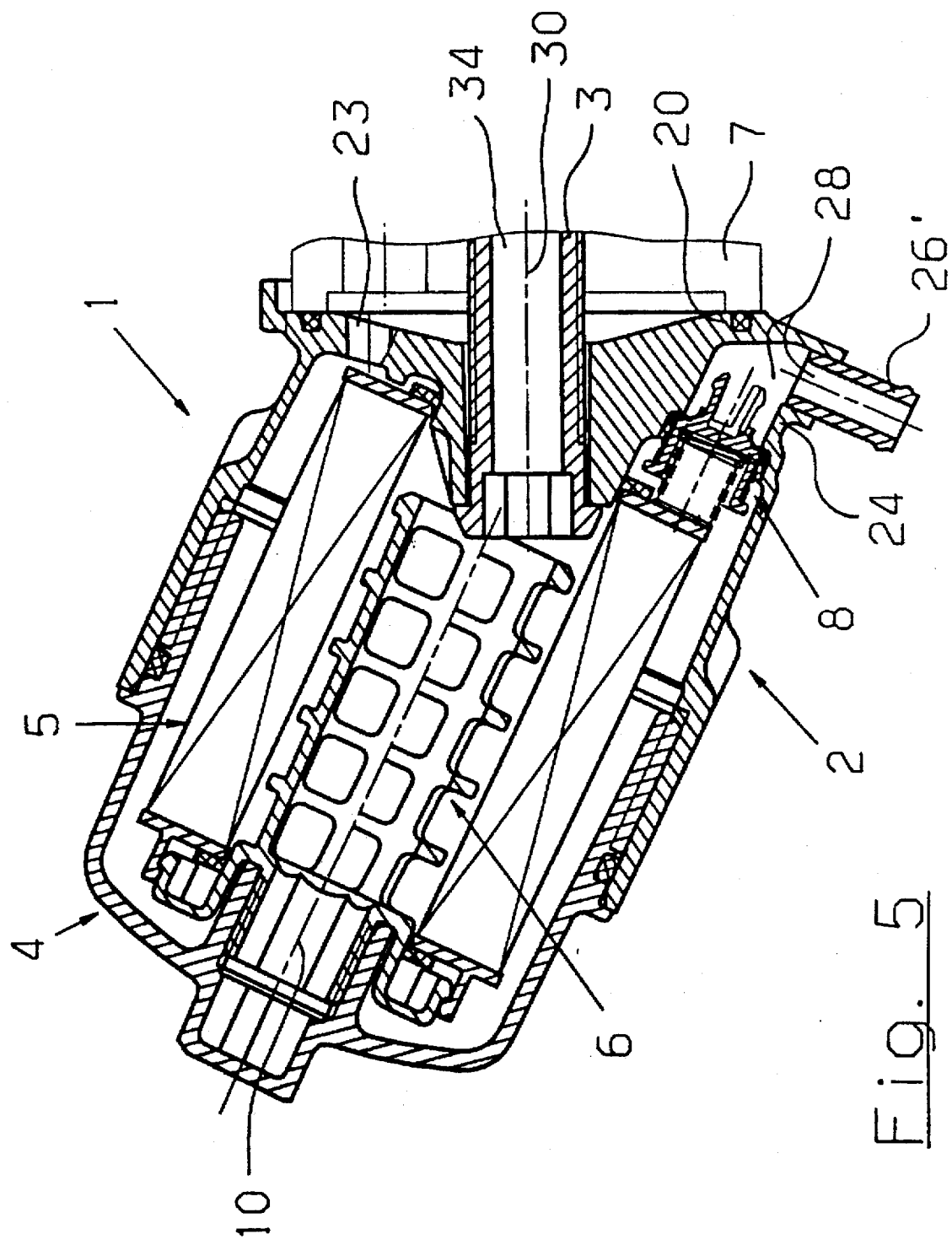
FIG. 5 is the liquid filter in a fifth embodiment.

Finally, FIG. 5 of the drawing illustrates an exemplary embodiment of the liquid filter 1 considered for those cases of application wherein, contrary to FIGS. 2 and 3, no drain passage 78 is provided in the filter connecting flange 7, wherein, in spite of this fact, an automatic drainage of the filter housing 2 when removing the filter insert 5 is required. For attaining this drainage, again a liquid drain passage 28 is provided in the lowest area of the filter housing 2 in the mounted condition, as in the exemplary embodiments according to FIGS. 2 and 3. With the liquid filter 1 according to FIG. 5, contrary to the exemplary embodiments mentioned before, the liquid drain passage 28 is extended in a connecting piece 26' for connection with a pipe or a hose, with the connecting piece 26' extending outside the filter connecting flange 7 approximately in a radial direction outwards from the circumferential wall 24 of the filter housing 2. At this connecting piece 26 a pipe or hose, not illustrated here, may be connected which leads to a pressure relieved liquid tank or collecting chamber, for example into the oil sump or the fuel tank of an internal combustion engine.

The drain valve 8 arranged in the liquid drain passage 28 underneath the filter insert 5 provides that the liquid drain passage 28 is closed fluid tight while the filter insert 5 is inserted. Only when one removes the filter insert 5 out of the filter housing 2 will the valve 8 attain its open position, whereby an automatic drainage of the interior of the filter housing 2, through the liquid drain passage 28 and the connecting piece 26' and the connecting line (not shown), is accomplished. Therefore this embodiment of the liquid filter 1 is particularly suitable for refitting or retrofitting wherein a change of the passage design in the filter connecting flange 7 is impossible. Thus simultaneously, the advantage of an automatic drainage of the filter housing 2, and the avoidance of environmental pollution, is attained.

Returning to FIG. 1, a liquid drain opening 101 may be provided in the cover 4. A suitable closure 103 is provided to close the opening 101 during operation of the filter. However, it will be noted that the closure 103 can be opened if necessary. Returning to FIG. 2, a bypass valve 105 may be provided in the support member 6. The bypass valve 105 will be opened thereby permitting a direct flow path between the crude side 106 and the clean side 107 thereby bypassing the filter insert 5. Returning to FIG. 3, a return check valve 109 may be provided in the hollow fastening screw 3 which prevents oil from re-entering the filter.

As is apparent from the foregoing specification, the invention is susceptible of being embodied with various alterations and modifications which may differ particularly from those that have been described in the preceding specification and description. It should be understood that we wish to embody within the scope of the patent warranted hereon all such modifications as reasonably and properly come within the scope of our contribution to the art.

We claim as our invention:

1. A liquid filter for mounting to a filter connecting flange of an internal combustion engine, the filter connecting flange including an outlet port and a threaded inlet aperture that passes through the filter connecting flange, the filter comprising:

a filter housing including an open first end, a second end that is closed by a front wall, and a peripheral sidewall coaxially surrounding a central axis, a cover releasably attached to the open end of the housing, the filter housing and cover defining a filter chamber, the front wall comprising a central aperture and an inlet port spaced radially outwardly of said central aperture for alignment with the outlet port in said filter connecting flange, said front wall having an inner surface facing said filter chamber and a planar outer surface for mounting to said filter connecting flange; wherein an angle between said central axis and the planar outer surface of said front wall is less than 90°;

a hollow fastening screw extending axially through said central aperture for defining an outlet of said filter housing, said fastening screw comprising a head portion disposed in the filter chamber, said head portion including a collar bearing against the inner surface of the front wall, the fastening screw further comprising an externally threaded shank extending through the front wall, the externally threaded shank for threadably coupling with the threaded outlet aperture of the filter connecting flange to clamp the outer surface of the front wall of the filter housing to the filter connecting flange, and a filter cartridge disposed in said filter chamber between said inlet port and said outlet for filtering a liquid.

2. A liquid filter according to claim 1, wherein said peripheral sidewall that has an axial length extending from the front wall and parallel to said central axis of the housing, the axial length of the sidewall being dimensioned such that an axial projection of the fastening screw does not intersect the sidewall of the filter housing.

3. A liquid filter according to claim 1, wherein the angle between said central axis of the filter housing and a plane defined by the planar outer surface portion of said front wall is between 15 and 45°.

4. A liquid filter according to claim 1, wherein the head portion of the fastening screw comprises a polygonal surface which functions as an area for receiving screwing tool.

5. A liquid filter according to claim 1, wherein, an annular groove is provided in a radially outward portion in the surface of the front wall of the filter housing facing the filter connecting flange and a sealing ring is provided which is received in the annular groove, wherein in the relaxed condition of the sealing ring, the sealing ring protrudes out of the groove, and wherein in the mounted condition of the liquid filter, the sealing ring is completely received in the annular groove while being elastically deformed.

6. A liquid filter according to claim 1, wherein the filter housing further comprises a liquid drain passage, and in the filter housing, within the liquid drain passage, a check valve is provided which is held in a closed position by the filter cartridge inserted in the filter housing with the cover closed, and which upon opening of the cover, automatically proceeds into an open position.

7. A liquid filter according to claim 6, wherein the liquid drain passage is guided in a pipe or hose connection piece positioned outwards of the filter connecting flange, with the connecting piece to be connected to a pipe or hose for a liquid drain into a pressure relieved liquid supply or collecting tank.

8. A liquid filter according to claim 1, wherein a circumference of the filter housing is provided with a liquid drain opening for draining the filter housing, wherein the liquid drain opening remains closed during operation of the filter, but is optionally openable.

9. A liquid filter according to claim 8, wherein the liquid drain opening is formed by a threaded aperture closed by means of a releasable screw.

10. A liquid filter according to claim 1, wherein said filter cartridge comprises a zigzag like folded star-shaped filter medium, and a support member provided for supporting an inner circumference of the filter medium.

11. A liquid filter according to claim 10, wherein a bypass valve is provided in the support member, whereby when a presettable pressure difference between a crude side and a clean side of the liquid filter is surpassed, a direct flow path from the crude side to the clean side is provided which bypasses the filter insert.

12. A liquid filter according to claim 10, further comprising connecting means for connecting the support member to the cover.

13. A liquid filter according to claim 10, wherein the support member is formed separately from the cover.

14. A liquid filter according to claim 10, wherein the support member is formed separately from the filter insert.

15. A liquid filter according to claim 10, wherein the support member and the filter insert are provided with snap-in connector means engageable with each other such that when taking the cover off of the filter housing, the filter insert is also removed from the housing.

16. A liquid filter according to claim 1, wherein the cover and the filter insert are provided with snap-in connector means engageable with each other such that when taking the cover off of the filter housing, the filter insert is also removed from the housing.

17. A liquid filter according to claim 1, wherein the filter housing is unitary.

18. A liquid filter according to claim 1, wherein a circumference of the cover is provided with a liquid drain opening that accommodates a removable closure.

19. A liquid filter according to claim 1, wherein the cover is provided with a liquid drain opening that accommodates a removable closure.

20. A liquid filter according to claim 1, wherein the hollow fastening screw comprises an axial drain passage that accommodates a return check valve.

* * * * *